(12) United States Patent
Yamamura et al.

(10) Patent No.: US 9,331,336 B2
(45) Date of Patent: May 3, 2016

(54) LITHIUM-ION SECONDARY BATTERY

(75) Inventors: Hideyuki Yamamura, Susono (JP); Shin Ushiroda, Susono (JP); Hiroyuki Yamaguchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 14/125,850

(22) PCT Filed: Jun. 13, 2011

(86) PCT No.: PCT/JP2011/063533
§ 371 (c)(1),
(2), (4) Date: Dec. 12, 2013

(87) PCT Pub. No.: WO2012/172633
PCT Pub. Date: Dec. 20, 2012

(65) Prior Publication Data
US 2014/0134489 A1 May 15, 2014

(51) Int. Cl.
*H01M 4/13* (2010.01)
*H01M 4/58* (2010.01)
*H01M 10/0525* (2010.01)

(52) U.S. Cl.
CPC ........ *H01M 4/5825* (2013.01); *H01M 10/0525* (2013.01); *Y02T 10/7011* (2013.01)

(58) Field of Classification Search
CPC .................................. H01M 4/13; H01M 4/58
USPC ........................ 429/218.1, 221, 231.6, 231.95
See application file for complete search history.

(56) References Cited

U.S. PATENT DOCUMENTS

| 4,391,734 A * | 7/1983 | Ferreira et al. ............. 252/378 R |
| 6,991,874 B1 | 1/2006 | Möhwald et al. |
| 2001/0031391 A1* | 10/2001 | Hironaka et al. ............... 429/94 |

FOREIGN PATENT DOCUMENTS

| JP | A-2002-513986 | 5/2002 |
| JP | A-2004-296370 | 10/2004 |
| JP | A-2011-154884 | 8/2011 |
| KR | 2002-0007452 A | 1/2002 |

* cited by examiner

*Primary Examiner* — Patrick Ryan
*Assistant Examiner* — Julian Anthony
(74) *Attorney, Agent, or Firm* — Oliff PLC

(57) ABSTRACT

Provided is a lithium-ion secondary battery that uses a non-carbonaceous negative electrode active material capable of exhibiting capacitance properties. The lithium-ion secondary battery includes a positive electrode, a negative electrode, and a non-aqueous electrolyte solution. The negative electrode includes a mica group mineral having at least one transition metal in its composition as a negative electrode active material.

3 Claims, 4 Drawing Sheets

# LITHIUM-ION SECONDARY BATTERY

TECHNICAL FIELD

The present invention relates to a lithium-ion secondary battery using a non-carbonaceous negative electrode material.

BACKGROUND ART

A lithium-ion secondary battery comprises a positive electrode, a negative electrode, and an electrolyte present between these two electrodes; and charging and discharging are mediated by lithium ions in the electrolyte moving back and forth between the two electrodes. As the active material for reversely storing and releasing lithium ions at the negative electrode, various carbonaceous materials have been used primarily. Recently, materials have been investigated to replace carbonaceous materials. Technical literatures relating to negative electrode materials other than carbonaceous ones include Patent Document 1.

CITATION LIST

Patent Literature

[Patent Document 1] Japanese Patent Application Publication No. 2004-296370

SUMMARY OF INVENTION

Technical Problem

High performance carbonaceous materials tend to be highly costly because its preparation requires special processing involving calcination at an elevated temperature. On the other hand, for example, sufficient capacity may not be obtained with non-carbonaceous negative electrodes comprising various clay minerals such as those in Patent Document 1 as the active materials. An objective of the present invention is thus to provide a cost-effective lithium-ion secondary battery using a non-carbonaceous negative electrode active material capable of exhibiting good capacitance properties.

Solution to Problem

The present invention provides a lithium-ion secondary battery comprising a positive electrode, a negative electrode and a non-aqueous electrolyte solution. The negative electrode comprises, as a negative electrode active material, a mica group mineral having at least one transition metal in its composition. Mica group minerals are layered silicates having a crystal unit structure in which an octahedral sheet is present between two tetrahedral sheets. The transition metal is contained at the center of the octahedron and/or tetrahedron (typically the octahedron) of the crystal.

According to such a lithium-ion secondary battery, since the negative electrode active material has a composition containing a transition metal, sufficient negative electrode capacity can be obtained. In addition, for the transition metal-containing mica group mineral, abundant resources are available and it is possible to serve as a negative electrode active material without special processing, thus the cost for producing lithium-ion secondary batteries can be reduced.

In the art disclosed herein, the term "mica group mineral having a transition metal in its composition" refers to one containing the transition metal to a level above what is generally considered to be an inevitable or unintentionally-incorporated impurity. Typically, it refers to a mica group mineral represented by a general formula: $XY_{2-3}Z_4O_{10}A_2$; described later, wherein the number of transition metals in the general formula is larger than 0.1 (e.g. 0.2 or larger).

In a preferable embodiment of the lithium-ion secondary battery, the mica group mineral comprises at least Mg and Fe as the transition metal. A preferable example of such mica group minerals is a silicate represented by general formula (I): $K(Mg,Fe^{2+})_3ZSi_3O_{10}A_2$. In the formula (I), Z is Al and/or $Fe^{3+}$. A is OH and/or F. According to such a lithium-ion secondary battery, better capacitance properties may be obtained. For example, in a preferable mica group mineral, the $Fe^{2+}$ content in the silicate is greater than the Mg content.

The transition metal-containing mica group mineral may exhibit good capacitance properties when used as a negative electrode active material. With its abundant deposits, the mineral is available at low costs. Thus, even if it is used as the negative electrode active material in a high-capacity battery, the manufacturing cost can be held down. A lithium-ion secondary battery comprising such a negative electrode active material in the negative electrode is preferable as a power supply used in a vehicle. Accordingly, the present invention provides a vehicle comprising a lithium-ion secondary battery disclosed herein. Especially, as shown in FIG. 6, a preferable vehicle 1 (e.g. an automobile) comprises such a lithium-ion secondary battery as a driving power supply 100 (typically, a driving power supply in a hybrid vehicle or an electric vehicle).

EMBODIMENTS OF INVENTION

Figure 1:
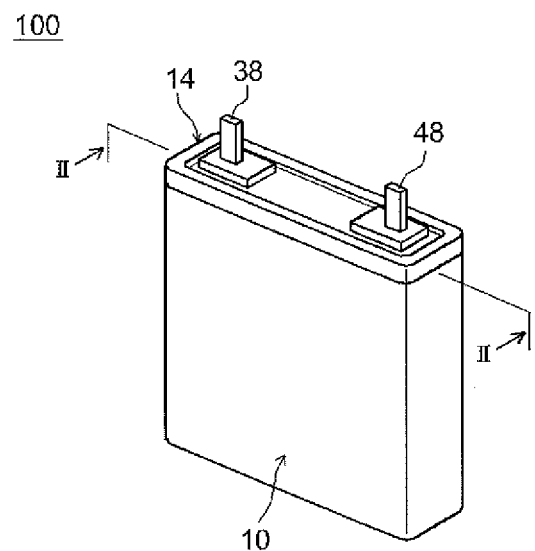
FIG. 1 shows a perspective view schematically illustrating the outer shape of a lithium-ion secondary battery according to an embodiment.

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

The lithium-ion secondary battery disclosed herein comprises, as its negative electrode active material, one, two or more species of mica group mineral having at least one transition metal in its composition. As for the general formula, the mica group mineral is represented by $XY_{2-3}Z_4O_{10}A_2$. X represents a cation located between layers (between a tetrahedral sheet and an octahedral sheet), with examples including K, Na, and Ca, etc. Y represents a cation located at the center of an octahedron (at an octahedral site), with examples including Al, Mg, Fe, Li, and Ti, etc. The octahedron may be a dioctahedron, trioctahedron, or an intermediate between these. Z represents a cation located at the center of a tetrahedron (at a tetrahedral site), with examples including Si, Al, and $Fe^{III}$, etc. A represents an anion located at a vertex of a tetrahedron or an octahedron, and it may be OH, F, Cl, O, or S, etc. X, Y, Z and A may be one, two or more appropriate species of ions, respectively. The mica group mineral used as the negative electrode active material in the lithium-ion secondary battery disclosed herein typically has a composition containing a transition metal at the Y and/or Z (typically Y) position(s) in the formula. The transition metal may be one, two or more species selected from Fe, Ti, Mn, Cr and V. In the mica group mineral, the transition metal may be present as an ion. Ions of the same transition metal in different oxidation states (e.g. $Fe^{2+}$ and $Fe^{3+}$) may coexist. As compared to a transition metal-free mica group mineral, such a transition metal-containing mica group mineral may have a higher capacity, and may exhibit a lower rate of capacity reduction caused by repeated charge-discharge cycles.

Specific examples of these transition metal-containing mica group minerals include silicates generally called as biotite, annite, siderophyllite, tetraferriannite, celadonite, ferroceladonite, ferro-aluminoceladonite, aluminoceladonite, glauconite, anandalite, and hydrobiotite, etc.

Preferable negative electrode active materials include layered silicates called as biotites represented by general formula (I): $K(Mg,Fe^{2+})_3ZSi_3O_{10}A_2$. In the formula (I), Z is Al and/or $Fe^{3+}$, typically Al and $Fe^{3+}$ (or $(Al,Fe^{3+})$ hereinafter). A is, for instance, OH or (OH,F). Biotite can be considered as a solid solution of phlogopite and annite. Examples of particularly preferable transition metal-containing silicates include silicates represented by general formula (II): $K(Mg, Fe^{2+})_3(Al,Fe^{3+})Si_3O_{10}(OH)_2$. Preferably, can be used biotites from Canada, Italy, the United States of America, Russia, Mexico, Panama, Ecuador, Venezuela, Guyana, Surinam, Chile, Argentine, Brazil, South Africa, Madagascar, Namibia, Cameroon, Guinea, Nigeria, Spain, Portugal, Great Britain, Switzerland, Germany, Greece, Ukraine, Romania, Turkey, Finland, Kazakhstan, Afghanistan, India, Indonesia, Vietnam, New Guinea, Papua New Guinea, Fiji, China, South Korea, Japan and Australia; or similar products.

As the negative electrode active material used in the lithium-ion secondary battery disclosed herein, a more preferable mica group mineral is such that the $Fe^{2+}$ content (in the number of moles) in the active material (the transition metal-containing mica group mineral) is greater than the Mg content (in the number of moles) (i.e. the $Fe^{2+}$ content per mole of the active material based on the general formula (I) is greater than 1.5 moles (preferably 1.7 moles or greater, e.g., 1.8 moles or greater)). According to such a negative electrode active material, even higher charge and discharge capacity can be obtained. Mica group minerals such as these in which more than half the number of cations occupying the octahedral sites are iron ions may be used and distributed, etc., while generally referred to as "annite" among persons skilled in the art. Preferably, for example, can be used annites from the United States of America, Canada, Tasmania, Russia, Great Britain, Greenland, Portugal, Spain, Switzerland, Germany, Ukraine, Norway, Mongolia, China, Japan, Philippines and Australia; or similar products. A preferable example of annite used in the art disclosed herein is one having a composition represented by general formula (II): $KFe_3AlSi_3O_{10}(OH)_2$; in which octahedral sites are essentially occupied solely by iron ions (in other words, essentially free of Mg).

As the negative electrode active material, such a silicate prepared as particles is typically used. As a method for processing the mineral into particles, a heretofore known method can be employed without particular limitations. These silicates prepared as particles can be used as is for the negative electrode active material without further processing such as heat treatment, etc. Alternatively, these particles may be used upon a surface treatment according to a heretofore known method to increase the conductivity (e.g. carbonaceous material coating), etc.

In a lithium-ion secondary battery using such a mica group mineral as a negative electrode active material, the lower discharge voltage limit can be set at a lower value (typically around 2.5 V) as compared to the 3 V of general lithium-ion secondary batteries using carbonaceous negative electrodes. In other words, even with positive electrodes of the same capacity at the same upper voltage limit, it can generate stable electric current without occurrence of battery degradation (lithium precipitation, etc.) further down to a lower voltage than a battery comprising a carbonaceous negative electrode.

The present invention provides a lithium-ion secondary battery characterized by comprising a negative electrode having a negative electrode active material disclosed herein. An embodiment of such a lithium-ion secondary battery is described in detail with an example of a lithium-ion secondary battery 100 (FIG. 1) having a configuration where an electrode body and a non-aqueous electrolyte solution are placed in a square battery case while the art disclosed herein is not limited to such an embodiment. In other words, the shape of the lithium-ion secondary battery disclosed herein is not particularly limited, and the materials, shapes, sizes, etc., of components such as the battery case, electrode body, etc., can be suitably selected in accordance with its intended use and capacity. For example, the battery case may have a cubic, flattened, cylindrical, or other shape. In the following drawings, members and sites providing the same effect may be indicated by the same reference numerals, and redundant descriptions may be omitted or abbreviated. Moreover, the dimensional relationships (of length, width, thickness, etc.) in each drawing do not represent actual dimensional relationships.

Figure 2:
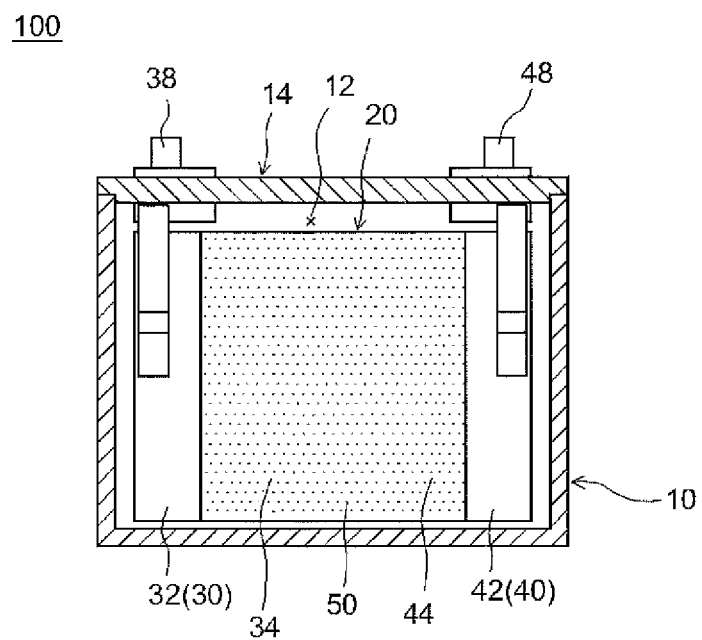
FIG. 2 shows a cross-sectional view taken along line II-II in FIG. 1.

As shown in FIG. 1 and FIG. 2, a lithium-ion secondary battery 100 can be constructed by placing a wound electrode body 20 along with an electrolyte solution not shown in the drawing via an opening 12 into a flat box-shaped battery case 10 suitable for the shape of the electrode body 20, and closing the opening 12 of the case 10 with a lid 14. The lid 14 has a positive terminal 38 and a negative terminal 48 for connection to the outside, with the terminals partially extending out from the surface of the lid 14.

The electrode body 20 is formed into a flattened shape by overlaying and winding up a positive electrode sheet 30 in which a positive electrode active material layer 34 is formed on the surface of a long sheet of a positive current collector 32 and a negative electrode sheet 40 in which a negative electrode active material layer 44 is formed on a long sheet of a negative current collector 42 along with two long sheets of separators 50, and laterally compressing the resulting wound body.

The positive electrode sheet 30 is formed such that the positive electrode active material layer 34 is not provided (or has been removed) on an edge along its length direction to expose the positive current collector 32. Similarly, the negative electrode sheet 40 to be wound is formed such that the negative electrode active material layer 44 is not provided (or has been removed) on an edge along its length direction to expose the negative current collector 42. The positive terminal 38 is joined to the exposed edge of the positive current collector 32 and the negative terminal 48 is joined to the exposed edge of the negative current collector 42, respectively, to form electrical connections with the positive electrode sheet 30 and the negative electrode sheet 40 of the flattened wound electrode body 20. The positive and negative terminals 38 and 48 can be joined to their respective positive and negative current collectors 32 and 42, for example, by ultrasonic welding, resistance welding, and so on.

In a typical embodiment of the art disclosed herein, a negative electrode active material in the negative electrode active material layer 44 consists of a negative electrode active material layer disclosed herein (a transition metal-containing mica group mineral). Alternatively, a negative electrode active material in the negative electrode active material layer 44 may contain a mixture of the transition metal-containing mica group mineral and other negative electrode active material(s) (e.g. a carbonaceous material having a graphite structure at least partially). The negative electrode active material layer 44 can be preferably formed by applying to the negative current collector 42 a paste or slurry composition (negative electrode material mixture) obtained by dispersing in a suitable solvent such a negative electrode active material along with a conductive material, a binder, etc., as necessary, followed by drying the composition. The amount of the negative electrode active material contained in the negative electrode material mixture is preferably about 60 to 98.8% by mass. When the transition metal-containing mica group mineral according to the present invention and other negative electrode active material(s) are used together as the negative electrode active material, the amount of the mica group mineral can be, for instance, about 1 to 99% by mass of their combined amount (the total amount of the negative electrode active material). In an embodiment of the art disclosed herein, 50% by mass or more of the entire negative electrode active material is a transition metal-containing mica group mineral (typically, a transition metal-containing silicate), or typically 70% by mass or more, for example 90% by mass or more, is a transition metal-containing mica group mineral. Essentially all of the negative electrode active material may be transition metal-containing mica group mineral.

As the conductive material, can be preferably used a powdered conductive material such as carbon powder, carbon fibers, and so on. As the carbon powder, various kinds of carbon black such as acetylene black, furnace black, Ketjen black, graphite powder and the like are preferable. One kind of conductive material can be used solely, or two or more kinds can be used in combination. The amount of the conductive material used can be, for instance, about 0.1 to 50 parts by mass (e.g. 0.1 to 33 parts by mass) relative to 100 parts by mass of the negative electrode active material (typically, a transition metal-containing silicate). In a preferable embodiment, the negative electrode comprises a conductive material besides the negative electrode active material.

As the binder, a suitable one can be selected for use from various polymers. One species may be used solely, or two or more species may be used in combination.

Examples include water-soluble polymers such as carboxymethyl cellulose (CMC), methyl cellulose (MC), cellulose acetate phthalate (CAP), hydroxypropyl methylcellulose (HPMC), hydroxypropyl methylcellulose phthalate (HP-MCP), polyvinyl alcohols (PVA), etc.; water-dispersible polymers such as fluorine containing resins such as polytetrafluoroethylene (PTFE), tetrafluoroethylene-perfluoroalkyl vinyl ether copolymers (PFA), tetrafluoroethylene-hexafluoropropylene copolymers (FEP), ethylene-tetrafluoroethylene copolymers (ETFE), etc., vinyl acetate copolymers, styrene-butadiene rubber (SBR), acrylic acid-modified SBR resins (SBR-based latexes), rubbers (gum arabic, etc.), etc.; oil-soluble polymers such as polyvinylidene fluoride (PVDF), polyvinylidene chloride (PVDC), polyethylene oxide (PEO), polypropylene oxide (PPO), polyethylene oxide-propylene oxide copolymers (PEO-PPO), polyimide, poly(amide-imide), etc.; and so on.

The amount of the binder added can be suitably selected in accordance with the type and amount of the negative electrode active material. For example, it can be about 0.1 to 33 parts by mass (e.g. 0.1 to 10 parts by mass) relative to 100 parts by mass of the negative electrode active material (typically, a transition metal-containing silicate).

As the negative current collector 42, can be preferably used a conductive material formed of a metal having good conductivity. For instance, copper or an alloy containing copper as the primary component can be used. The shape of the negative current collector 42 is not particularly limited as it may vary in accordance with the shape, etc., of the lithium-ion secondary battery, and it may have a variety of shapes such as a rod, plate, sheet, foil, mesh, and so on. In the present embodiment, a copper sheet is used as the negative current collector 42 and can be preferably used in a lithium-ion secondary battery 100 comprising a wound electrode body 20. In such an embodiment, for example, a copper sheet having a thickness of about 6 μm to 30 μm can be preferably used.

The positive electrode active material layer 34 can preferably be formed, for instance, by applying to the positive current collector 32 a paste or slurry composition (positive electrode material mixture) obtained by dispersing in a suitable solvent a positive electrode active material along with a conductive material, a binder, etc., as necessary, and by drying the composition.

As the positive electrode active material, a positive electrode material capable of storing and releasing lithium is used, and one, two or more species of substances (e.g. a layered oxide, a spinel oxide) used conventionally in lithium-ion secondary batteries can be used without particular limitations. Examples include lithium-containing composite oxides such as lithium nickel-based composite oxides, lithium cobalt-based composite oxides, lithium manganese-based composite oxides, lithium magnesium-based composite oxides, etc.

Herein, the scope of the lithium-nickel-based composite oxide encompasses oxides containing lithium (Li) and nickel (Ni) as constituent metal elements as well as oxides containing as constituent metal elements, in addition to lithium and nickel, at least one other kind of metal element (i.e., a transition metal element and/or a main group metal element other than Li and Ni) at a ratio roughly equal to or less than nickel (typically at a ratio less than nickel) based on the number of atoms. The metal element other than Li and Ni can be, for instance, one, two or more kinds of metal elements selected from a group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). It is noted that the same applies also to the scopes of the lithium-cobalt-based composite oxide, the lithium-manganese-based composite oxide, and the lithium-magnesium-based composite oxide.

Alternatively, an olivine-type lithium phosphate represented by general formula $LiMPO_4$ (M is at least one, or more species of Co, Ni, Mn and Fe; e.g. $LiFePO_4$, $LiMnPO_4$) may be used as the positive electrode active material.

The amount of the positive electrode active material contained in the positive electrode material mixture can be, for instance, about 80 to 95% by mass.

As the conductive material, among those similar to the conductive materials listed above for the negative electrode, one species can be used solely, or two or more species can be used in combination. The amount of the conductive material contained in the positive electrode material mixture can be suitably selected in accordance with the type and amount of the positive electrode active material. For instance, it can be about 1 to 10% by mass.

As the binder, of those listed earlier for the negative electrode, one kind can be used solely, or two or more kinds can be used in combination. The amount of the binder added can be suitably selected in accordance with the kind and amount of the positive electrode active material. For instance, it can be about 1 to 5% by mass of the positive electrode material mixture.

As the positive current collector 32, can be preferably used a conductive material formed of a metal having good conductivity. For example, can be used aluminum or an alloy containing aluminum as the primary component. The shape of the positive current collector 32 is not particularly limited as it may vary in accordance with the shape, etc., of the lithium-ion secondary battery, and it may have a variety of shapes such as a rod, plate, sheet, foil, mesh, and so on. In the present embodiment, an aluminum sheet is used as the positive current collector 32 and can be preferably used in a lithium-ion secondary battery 100 comprising a wound electrode body 20. In such an embodiment, for example, an aluminum sheet having a thickness of about 10 μm to 30 μm can be preferably used.

The non-aqueous electrolyte solution comprises a supporting salt in a non-aqueous solvent (organic solvent). As the supporting salt, a lithium salt used as a supporting salt in a general lithium-ion secondary battery can be suitably selected for use. Examples of such a lithium salt include $LiPF_6$, $LiBF_4$, $LiClO_4$, $LiAsF_6$, $Li(CF_3SO_2)_2N$, $LiCF_3SO_3$, and the like. One kind of such a supporting salt can be used solely, or two or more kinds can be used in combination. $LiPF_6$ can be given as an especially preferable example. It is preferable to prepare the non-aqueous electrolyte solution to have a supporting salt concentration within a range of for instance, 0.7 mol/L to 1.3 mol/L.

As the non-aqueous solvent, an organic solvent used in general lithium-ion secondary batteries can be suitably selected for use. Examples of especially preferable non-aqueous solvents include carbonates such as ethylene carbonate (EC), diethyl carbonate (DEC), dimethyl carbonate (DMC), ethyl methyl carbonate (EMC), vinylene carbonate (VC), propylene carbonate (PC), and so on. Of these organic solvents, one kind can be used solely, or two or more kinds can be used in combination. For example, a mixture of EC and DEC can be preferably used.

The separator 50 is a layer present between the positive electrode sheet 30 and the negative electrode 40, which is typically formed in a sheet and positioned so as to be in contact with both the positive electrode active material layer 34 of the positive electrode sheet 30 and the negative electrode active material layer 44 of the negative electrode sheet 40. It functions to prevent a short circuit associated with direct contact between the two electrode active material layers 34 and 44 on the positive electrode sheet 30 and the negative electrode sheet 40. It also functions to form conductive paths (conductive pathways) between the electrodes, with the pores of the separator 50 having been impregnated with the electrolyte solution. As such a separator 50, a conventional separator can be used without particular limitations. For example, a porous sheet of a resin (micro-porous resin sheet) can be preferably used. A porous sheet of a polyolefin resin such as polyethylene (PE), polypropylene (PP), polystyrene, etc., is preferable. In particular, can be used preferably a PE sheet, a PP sheet, a multi-layer sheet having overlaid PE and PP layers, or the like. The thickness of the separator is preferably set within a range of about 10 μm to 40 μm, for example.

While, for practicing the present invention, it is unnecessary to reveal the mechanism by which the transition metal-containing mica group mineral disclosed herein can serve as a negative electrode active material and exhibit sufficient reversible capacity in the lithium-ion secondary battery disclosed herein, the following can be considered.

In the lithium-ion secondary battery disclosed herein, during charging, when $Li^+$ ions are intercalated into the negative electrode, electrons travelled via an outer circuit from the positive electrode are stored in the negative electrode while reducing transition metal ions contained in the negative electrode active material. During discharging, when $Li^+$ ions are deintercalated from the negative electrode, the transition metal is in turn oxidized for charge compensation, and electrons flow toward the positive electrode. In other words, the same kind of charge compensation that would take place at the positive electrode in a general lithium-ion secondary battery may occur at the negative electrode in the lithium-ion secondary battery disclosed herein. On the other hand, for example, when a mica group mineral which is free of a transition metal (e.g. muscovite, phlogopite, etc.) is used as the negative electrode active material, due to lack of such a charge compensation mechanism, the intercalation and deintercalation of $Li^+$ ions at the negative electrode are limited, and the quantity of chargeable electricity (reversible capacity) becomes smaller. A negative electrode using a transition metal-free mica group mineral is considered to lead to failures such as: (1) $Li^+$ ions are not intercalated between crystal layers, but instead trapped in defect sites in the crystal structure; (2) $Li^+$ ions are incorporated in the crystal structure by replacing cations ($K^+$, etc.) present between layers or cations ($Al^{3+}$, etc.) located at octahedral sites, and as these replaced cations are reduced in place of $Li^+$ ions according to the ionization tendencies, etc., the composition of the mica group mineral itself will be altered; and so on.

In the lithium-ion secondary battery disclosed herein, by using, as a negative electrode active material, an annite in which cations at octahedral sites are primarily $Fe^{2+}$ (e.g. more than 50% by number, typically 55% by number or more), even higher charge and discharge capacity is obtained possibly for the following reasons: That is, $Fe^{2+}$ has an ionic radius of 0.78 Å, which is larger than the 0.72 Å of $Mg^{2+}$; and therefore, as compared to a mica group mineral having primarily Mg at octahedral sites, it has a larger interlayer distance for $Li^+$ intercalation and facilitates the $Li^+$ intercalation/deintercalation at the negative electrode. This may result in even higher charge and discharge capacity. The present inventors analyzed several species of mica group minerals with varied Fe ion contents by powder X-ray diffraction. The resulting diffraction intensity spectra support that as the Fe ion content increases, the interlayer distance increases.

It is noted that with respect to the mica group mineral (typically, a natural product) in the art disclosed herein, the numerical ranges regarding the respective element contents are not to be taken exactly, and some deviations from such ranges should be allowed as far as the objective of the present invention is accomplished.

Several embodiments relevant to the present invention are described below although this is not to limit the present invention to these specific examples. In the following description, the terms "parts" and "%" are based on the mass unless specifically stated otherwise.

Example 1

A biotite (from Canada, $K(Mg,Fe^{2+})_3(Al,Fe^{3+})Si_3O_{10}(OH)_2$) available from Avance, K.K. was ground in a mortar for one hour into particles having an average particle diameter of 23 μm. The biotite particles (3 g), acetylene black (conductive material) and PVDF (binder) were mixed in N-methyl-2-pyrrolidone (NMP) at a mass ratio of 75:10:15. The resulting material mixture was applied to 10 μm thick copper foil (available from Nippon Foil Mfg. Co., Ltd.), allowed to dry, and pressed to a density of 1.6 g/cm³ to obtain an electrode sheet.

Figure 7:
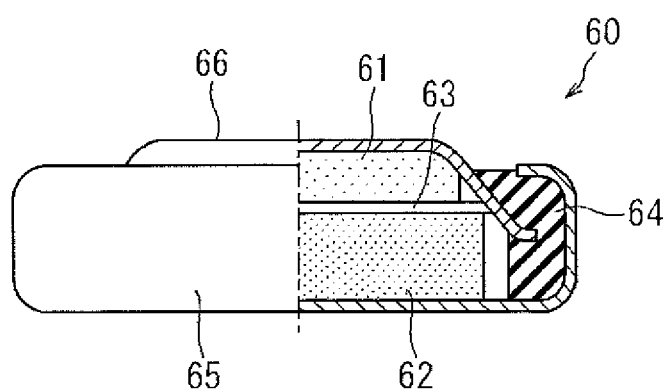
FIG. 7 shows a partial cross-sectional view schematically illustrating the shape of a test cell.

The electrode sheet was cut into a 16 mm diameter circle to obtain a test biotite electrode (working electrode). As shown in FIG. 7, the working electrode 61, a lithium counter electrode 62 (metal lithium foil of 19 mm diameter, 0.15 mm thickness), and a separator 63 (a porous polyethylene sheet of 22 mm diameter, 20 μm thickness) impregnated with an electrolyte solution (1 M $LiPF_6$ solution (in a mixed solvent of EC/DEC at 3:7 volume ratio) were placed in a stainless steel container 65 (counter electrode terminal) and sealed with a gasket 64 and a lid 66 (working electrode terminal) to construct a 2032 coin cell 60 (a test half-cell) of 20 mm diameter and 3.2 mm thickness.

Example 2

In the same manner as Example 1 except that a muscovite ($KAl_2Si_3AlO_{10}(OH)_2$) available from Alfa Aesar was used in place of the biotite in Example 1, a 2032 coin cell was constructed.

Example 3

In the same manner as Example 1 except that a talc (available from Aldrich Corporation, $Mg_3Si_4O_{10}(OH)_2$) was used in place of the biotite in Example 1, a 2032 coin cell was constructed.

Capacity Measurement

Figure 3:
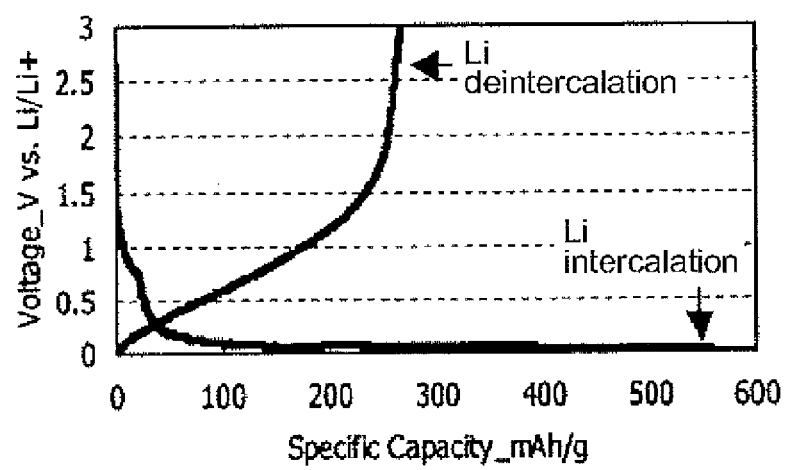
FIG. 3 shows a graph of the charge and discharge curves of a test cell of Example 1 in a capacity measurement test.
Figure 4:
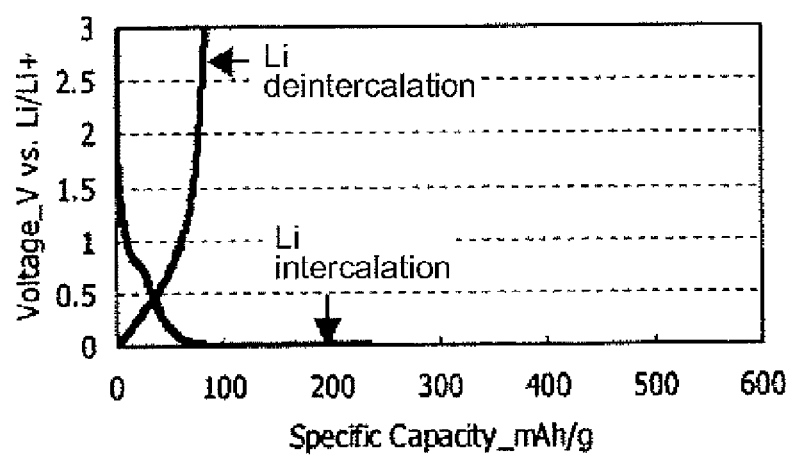
FIG. 4 shows a graph of the charge and discharge curves of a test cell of Example 2 in a capacity measurement test.
Figure 5:
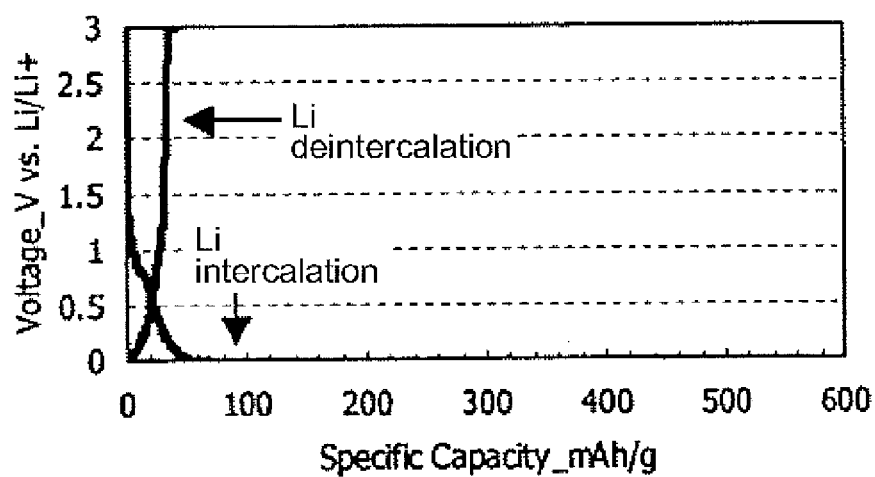
FIG. 5 shows a graph of the charge and discharge curves of a test cell of Example 3 in a capacity measurement test.
Figure 6:
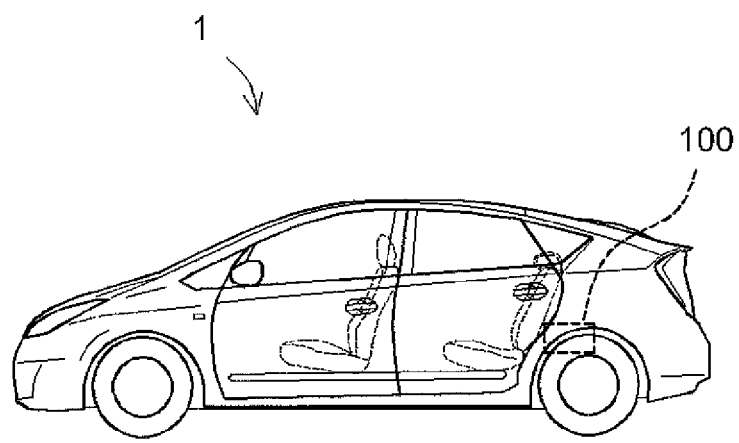
FIG. 6 shows a side view schematically illustrating a vehicle (automobile) comprising a lithium-ion secondary battery of the present invention.

Each cell of Examples 1 to 3 was put through five cycles, with one cycle consisting of intercalation of Li into the working electrode at a rate of 0.1 C (1 C being the current necessary to fully charge or discharge a battery in one hour) to a voltage across the two terminals of 0.01 V and deintercalation (releasing) of Li from the working electrode at the same rate to a voltage across the two terminals of 3.0 V, and the amount of Li released (the capacity value of Li deintercalation; the discharge capacity obtainable when using the working electrode as a negative electrode) (mAh/g) was measured in each cycle. FIGS. 3 to 5 show the charge and discharge curves of the first cycles for the respective cells of Examples 1 to 3. Regarding the respective batteries of Examples 1 to 3, Table 1 shows the charge capacities (only the initial measurement value for Example 3) measured in the respective cycles along with the type of active material of the working electrode.

TABLE 1

| Example | Active material of working electrode | Capacity (mAh/g) | | | | |
|---|---|---|---|---|---|---|
| | | 1 | 2 | 3 | 4 | 5 |
| 1 | Biotite | 274.9 | 243.7 | 234.4 | 213.8 | 208.6 |
| 2 | Muscovite | 91.8 | 89.2 | 62.2 | 39.8 | 40.1 |
| 3 | Talc | 46.6 | — | — | — | — |

As shown in Table 1, the battery of Example 1 whose working electrode comprised an active material containing a transition metal ($Fe^{2+}$, $Fe^{3+}$ here) showed a capacity value as high as approximately 3 to 6 times in each cycle as compared to the batteries of Examples 2 and 3, which were free of transition metals. The battery of Example 1 showed a significantly smaller rate of capacity reduction than Example 2 even in the fifth cycle. From these results, it has been confirmed that when used as a negative electrode, the working electrode of Example 1 may show a capacity effective for practical use.

Example 4

A mica group mineral having an iron content of 1.8 moles per mole (an annite available from Mineral Street, $KFe_{1.8}Mg_1Al_{1.5}Si_3O_{10}(OH_{1.6}F_{0.4})$) was ground in a mortar for one hour into particles having an average particle diameter of 23 μm. The annite particles (3 g), acetylene black (conductive material), CMC and SBR were dissolved in water at a mass ratio of 88:10:1:1. The resulting material mixture (an aqueous solution) was applied to 10 μm thick copper foil (available from Nippon Foil Mfg. Co., Ltd.), allowed to dry, and then pressed to an electrode density of 1.6 g/cm³ to obtain an electrode sheet.

The electrode sheet was cut into a 16 mm diameter circle to obtain a test annite electrode (working electrode). In the same manner as Example 1 except that this working electrode was used, a 2032 coin cell was constructed.

Example 5

In the same manner as Example 4 except that a mica group mineral (a biotite available from Avance, K.K.; $K_{0.9}Na_{0.1}Ca_{0.1}Fe_{1.3}Mg_{1.8}Al_{1.2}Si_3O_{10}(OH_{1.1}F_{0.9})$) having an iron content of 1.3 moles per mole was used in place of the annite used in Example 4, a 2032 coin cell was constructed.

Example 6

In the same manner as Example 4 except that a mica group mineral essentially free of a transition metal (a phlogopite available from Mineral Street, $K_{0.9}Ca_{0.1}Fe_{0.1}Mg_{2.8}Al_{1.1}Si_3O_{10}(OH_{1.2}F_{0.80})$) was used in place of the annite used in Example 4, a 2032 coin cell was constructed.

Capacity Measurement

Figure 8:
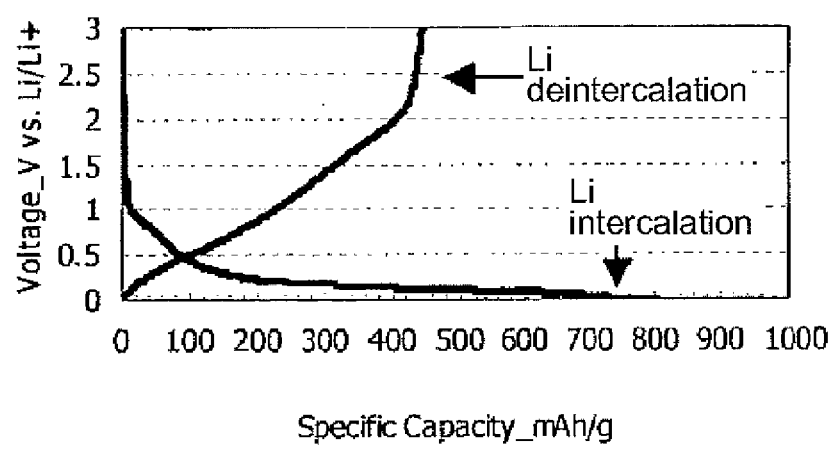
FIG. 8 shows a graph of the charge and discharge curves of a test cell of Example 4 in a capacity measurement test.

With respect to each cell of Examples 4 to 6, Li was intercalated into the working electrode at a rate of 0.1 C to a voltage across the two terminals of 0.01 V and Li was then deintercalated from the working electrode at the same rate to 3.0 V, and the amount of Li intercalated (the capacity for Li intercalation) and the amount of Li deintercalated were measured. FIG. 8 shows the charge and discharge curve of the cell of Example 4. For the respective batteries of Examples 4 to 6, Table 2 shows the capacities measured along with the types of active material of their working electrodes.

TABLE 2

| Example | Active material of working electrode | Fe$^{2+}$ content per mole of active material (mol) | Capacity (mAh/g) Li intercalation | Capacity (mAh/g) Li deintercalation |
|---|---|---|---|---|
| 4 | Annite | 1.8 | 823.4 | 445.0 |
| 5 | Biotite | 1.3 | 519.3 | 252.5 |
| 6 | Phlogopite | 0.1 | 89.9 | 63.1 |

As shown in Table 2, between the batteries of Examples 4 and 5 each using a mica group mineral having iron in its composition as the negative electrode active material, with the battery of Example 5, the Li intercalation capacity was approximately 6 times higher and the Li deintercalation capacity was about 4 times higher as compared to the battery of Example 6. According to the battery of Example 4 having a higher Fe$^{2+}$ content, even better results were obtained. In particular, it achieved 9 times or higher than the Li intercalation capacity of the battery of Example 6 and 7 times or higher than the Li deintercalation capacity. From these results, it has been confirmed that as the Fe$^{2+}$ content increases, the charge and discharge capacity may increase.

Although the present invention have been described in detail above, the embodiments described above are merely examples, and the art disclosed herein includes various modifications and changes made to the specific examples illustrated above.

REFERENCE SIGNS LIST

1 vehicle
20 wound electrode body
30 positive electrode sheet
32 positive current collector
34 positive electrode active material layer
38 positive terminal
40 negative electrode sheet
42 negative current collector
44 negative electrode active material layer

The invention claimed is:

1. A lithium-ion secondary battery comprising a positive electrode, a negative electrode, and a non-aqueous electrolyte solution, wherein:
    the negative electrode comprises, as a negative electrode active material, a mica group mineral having Fe and Mg in its composition;
    the mica group mineral comprises Fe$^{2+}$;
    the mica group mineral is represented by general formula (I): K(Mg,Fe$^{2+}$)$_3$ZSi$_3$O$_{10}$A$_2$, with Z being Al and/or Fe$^{3+}$, and A being OH and/or F; and
    a content of Fe$^{2+}$ is greater than a content of Mg in the mica group mineral.

2. The lithium-ion secondary battery according to claim 1, wherein the negative electrode comprises, as the mica group mineral, biotites or annite.

3. A vehicle comprising the lithium-ion secondary battery according to claim 1.

* * * * *